(12) United States Patent
Searby

(10) Patent No.: US 7,450,371 B2
(45) Date of Patent: Nov. 11, 2008

(54) COMPUTER STABILITY SYSTEM

(75) Inventor: Tom J. Searby, Greeley, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 390 days.

(21) Appl. No.: 11/066,813

(22) Filed: Feb. 25, 2005

(65) Prior Publication Data
US 2006/0198092 A1    Sep. 7, 2006

(51) Int. Cl.
G06F 1/16    (2006.01)
(52) U.S. Cl. ............... 361/683; 312/223.1; 312/223.2; 248/188.8
(58) Field of Classification Search ............... D14/352
See application file for complete search history.

(56) References Cited
U.S. PATENT DOCUMENTS

| 4,368,867 | A | * | 1/1983 | Pendleton et al. ...... 248/346.06 |
| 4,635,811 | A | | 1/1987 | Lodi |
| 4,872,733 | A | | 10/1989 | Tedham et al. |
| 4,955,873 | A | * | 9/1990 | Rajlevsky ................ 604/322 |
| 5,020,768 | A | * | 6/1991 | Hardt et al. ............... 248/678 |
| D330,021 | S | | 10/1992 | Kline et al. |
| 5,263,668 | A | * | 11/1993 | Reiter ................. 248/346.01 |
| 5,388,792 | A | | 2/1995 | Hastings et al. |
| 5,749,637 | A | | 5/1998 | McMahan et al. |
| 5,887,962 | A | | 3/1999 | Tsai |
| 5,934,774 | A | | 8/1999 | Wu et al. |
| 6,059,384 | A | * | 5/2000 | Ho .......................... 312/223.2 |
| 6,141,209 | A | | 10/2000 | Kerrigan et al. |
| 6,439,528 | B1 | | 8/2002 | Goto et al. |
| 6,597,577 | B1 | | 7/2003 | Tang et al. |
| 6,616,113 | B2 | | 9/2003 | Justin |
| 6,805,327 | B1 | | 10/2004 | Shen |
| 6,842,337 | B2 | | 1/2005 | Helot et al. |
| 2005/0051685 | A1 | * | 3/2005 | Wu ........................ 248/188.8 |

* cited by examiner

Primary Examiner—Jayprakash N Gandhi
Assistant Examiner—Anthony Q Edwards

(57) ABSTRACT

A computer stability system comprises a pedestal adapted to be releasably coupled to a computer chassis. The pedestal is adapted to cooperatively engage at least one foot on the computer chassis to releasably couple the pedestal to the computer chassis.

21 Claims, 3 Drawing Sheets

COMPUTER STABILITY SYSTEM

BACKGROUND OF THE INVENTION

As a height of a computer system such as tower computer and/or other type of computer chassis or component increases, the computer system generally becomes less stable (e.g., susceptible to tipping). To add stability to such computer systems, a width of a base of the computer system is generally increased to provide a larger footprint for the computer system (e.g., by increasing the width of the system itself at the base or by providing a pedestal separately attachable to the base of the computer system). However, these configurations are generally awkward to handle during manufacturing/assembly, difficult to package and costly to ship. Additionally, separately attachable pedestals are generally difficult to install, require the use of tools and are susceptible to lost or missing attachment parts (e.g., screws or other types of fasteners).

BRIEF DESCRIPTION OF THE DRAWINGS

For a more complete understanding of the present invention, and the objects and advantages thereof, reference is now made to the following descriptions taken in connection with the accompanying drawings in which.

DETAILED DESCRIPTION OF THE DRAWINGS

The preferred embodiments of the present invention and the advantages thereof are best understood by referring to FIGS. 1-6 of the drawings, like numerals being used for like and corresponding parts of the various drawings.

Figure 1:
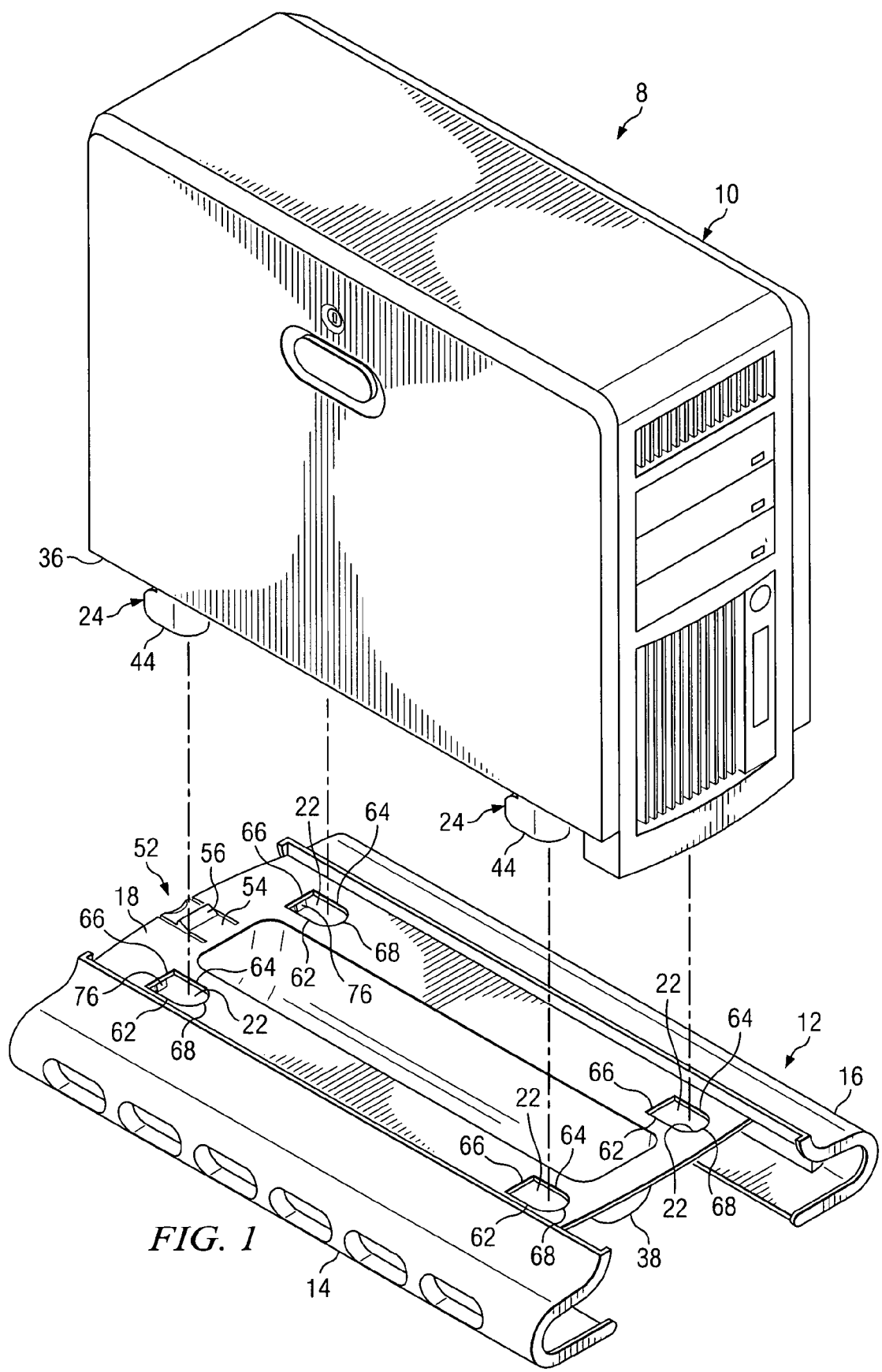
FIG. 1 is a front perspective view of an embodiment of a computer stability system in accordance with the present invention.

FIG. 1 is a diagram illustrating an embodiment of a computer stability system 8 in accordance with the present invention. In the embodiment illustrated in FIG. 1, system 8 comprises a computer chassis 10 releasably couplable to a pedestal 12. Pedestal 12 comprises a pair of spaced apart base members 14 and 16 and a transverse support member 18 extending between base members 14 and 16 to support chassis 10. When chassis 10 is supported by transverse support member 18, base members 14 and 16 extend laterally from chassis 10 to effectively increase the width (or footprint) of the base of chassis 10. The increased width substantially reduces or eliminates the likelihood of chassis 10 tipping or falling over.

In the embodiment illustrated in FIG. 1, transverse support member 18 comprises a plurality of openings 22 to cooperatively engage a plurality of corresponding feet 24 disposed on chassis bottom wall 36. Transverse support member 18 comprises a rib 38 to substantially reduce or eliminate deflection of transverse support member 18 caused by the weight of chassis 10 when chassis 10 is mounted on pedestal 12. In the embodiment illustrated in FIG. 1, rib 38 is integral with transverse support member 18 and is generally parallel to base members 14 and 16; however, it should be understood that rib 38 can be a separate component attachable to transverse support member 18 and configured in any orientation thereon, such as perpendicular to base members 14 and 16. Furthermore, a greater number of ribs 38 can be incorporated to provide additional stability to transverse support member 18.

Figure 2:
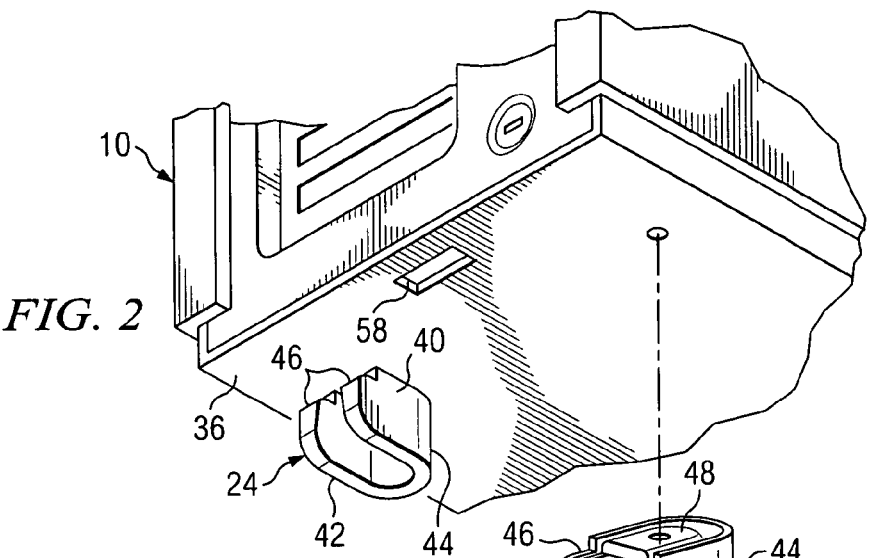
FIG. 2 is a bottom perspective view of an embodiment of a computer chassis of the computer stability system in FIG. 1 in accordance with the present invention.

FIG. 2 is a diagram illustrating an embodiment of chassis 10 in accordance with the present invention. In the embodiment illustrated in FIG. 2, feet 24 are attached to chassis bottom wall 36 and are used to support chassis 10 when chassis 10 is used independently of pedestal 12. Feet 24 are preferably formed of a plastic material to eliminate scratching of a support surface, such as a desk or floor, when chassis 10 is used without pedestal 12. However, it should be understood that feet 24 may be formed from other materials. In accordance with one embodiment of the present invention, feet 24 are generally "U" shaped having a first side 40, a second side 42 and a curved end 44. It should be understood, however, that feet 24 can be any particular shape, such as rectangular, square, or circular, by way of example. Additionally, it should be understood that reference herein to "foot" or "feet" pertaining to feet 24 is used to indicate a single foot or multiple feet, respectively, as it should be understood that chassis 10 may be configured with a varying quantity of feet 24.

Each foot 24 comprises a mounting surface 48 adapted to be seated against bottom wall 36 and receive a mounting screw 50. For example, in the embodiment illustrated in FIG. 2, mounting surface 48 is placed in abutment with chassis bottom wall 36 such that mounting screw 50 securely fastens a corresponding foot 24 to chassis bottom wall 36. However, it should be understood that other methods of attachment may be used to secure feet 24 to chassis 10, such as an adhesive or other type of fastening device and/or element. Further, it should be understood that in some embodiments, feet 24 may comprise other types of elements or structure protruding and/or otherwise extending in a downwardly facing direction (e.g., toward a support surface) to support a weight of chassis on the support surface. Additionally, it should be understood that in some embodiments of the present invention, feet 24 may be formed integral with and/or otherwise part of bottom wall 36 (e.g., as a unitary construction and/or a single component or part).

Figure 3:
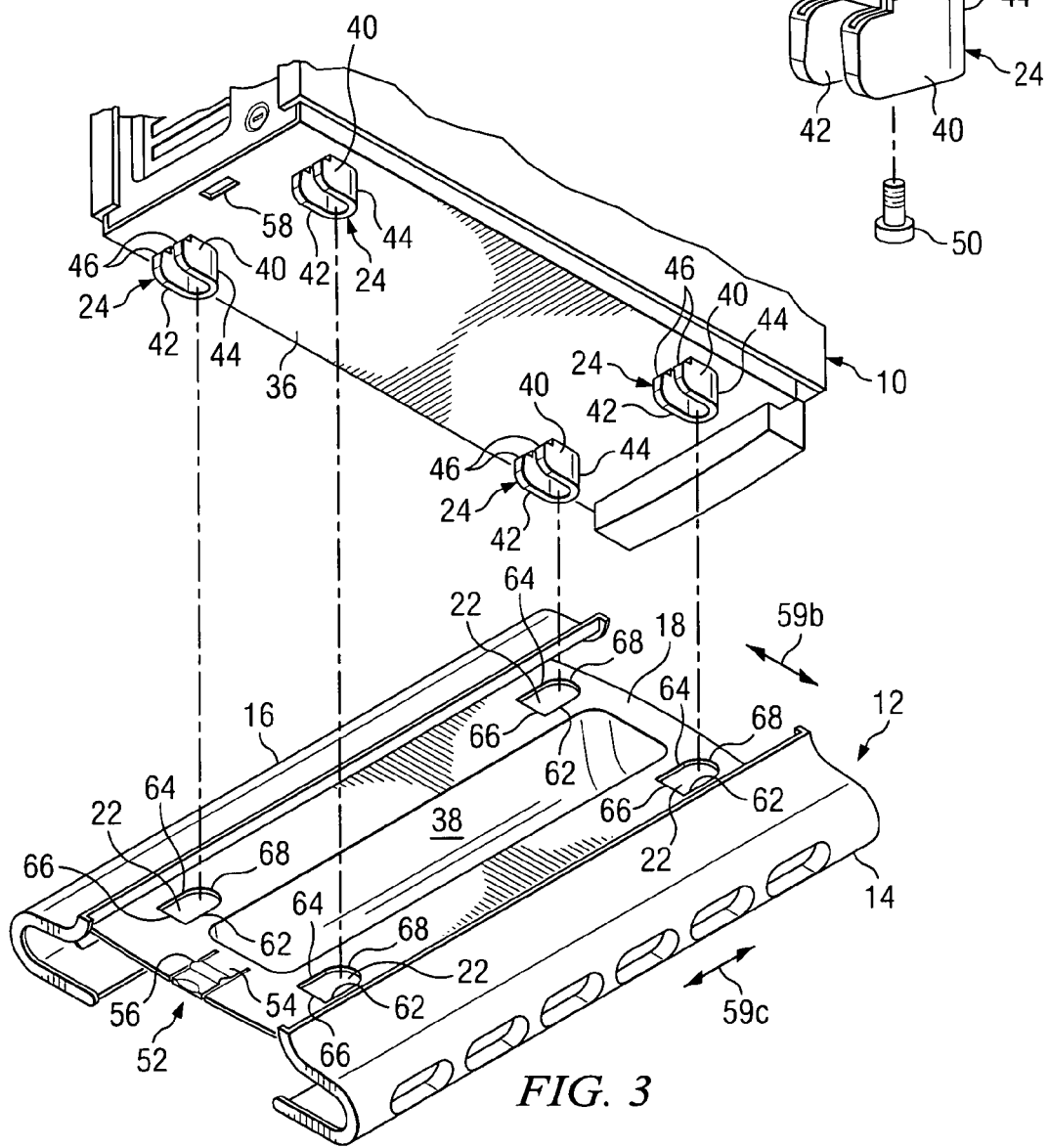
FIG. 3 is an exploded perspective view of the computer stability system illustrated in FIG. 1.

FIG. 3 is another diagram illustrating system 8 of FIG. 1 in accordance with the present invention. Referring to FIGS. 1 and 3, openings 22 are formed having a shape defined by a pair of side edges 62 and 64, a rear edge 66 and a forward edge 68. Openings 22 are slightly larger than feet 24 to permit feet 24 to be inserted through openings 22. In some embodiments of the present invention, openings 22 are formed having a shape complementary to a shape of feet 24 to provide a visual orientation indicator and maintain a desired orientation of chassis 10 relative to pedestal 12. For example, forward edge 68 and curved segment 44 correspondingly engage to provide a visual orientation indicator and ensure proper alignment of chassis 10 with pedestal 12, thereby permitting a user to easily orient and align feet 24 with openings 22.

While the embodiment illustrated in FIG. 3 illustrates four openings 22 and four corresponding feet 24, it should be understood that a greater or fewer number of openings 22 and feet 24 can be used.

In the embodiment illustrated in FIGS. 1 and 3, pedestal 12 comprises a locking member 52 disposed on transverse support member 18 for securely and releasably coupling chassis 10 to pedestal 12. Locking member 52 comprises a flexible and/or deflectable arm 54 having a rib 56 for releasably engaging a locking slot 58 formed on chassis bottom wall 36.

In operation, the engagement of rib 56 with locking slot 58 limits movement between chassis 10 and pedestal 12.

Figure 4:
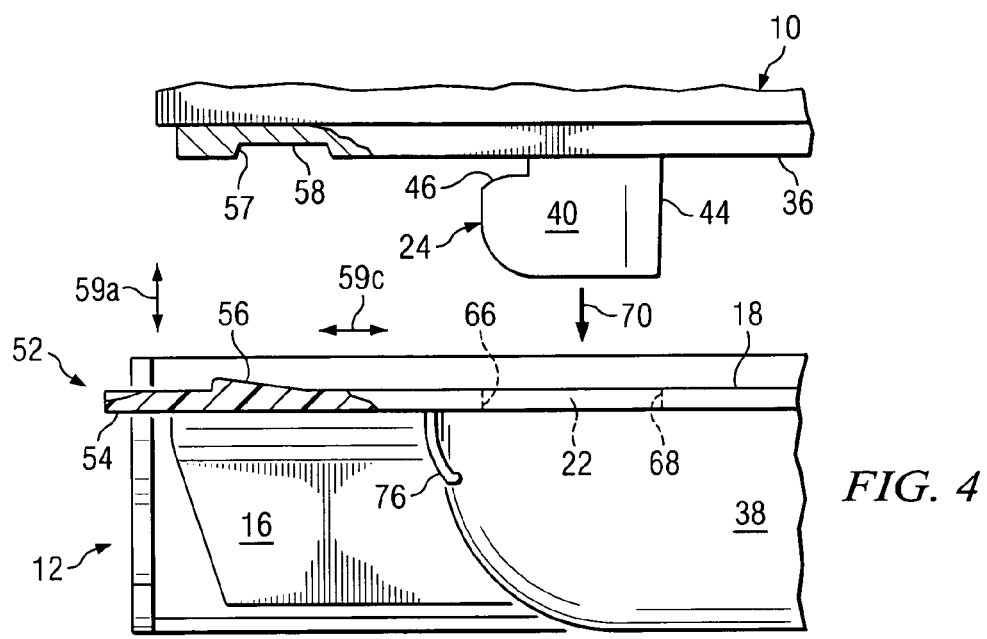
FIGS. 4-6 are diagrams illustrating an embodiment of a locking member of the computer stability system illustrated in FIG. 1 in accordance with the present invention.
Figure 5:
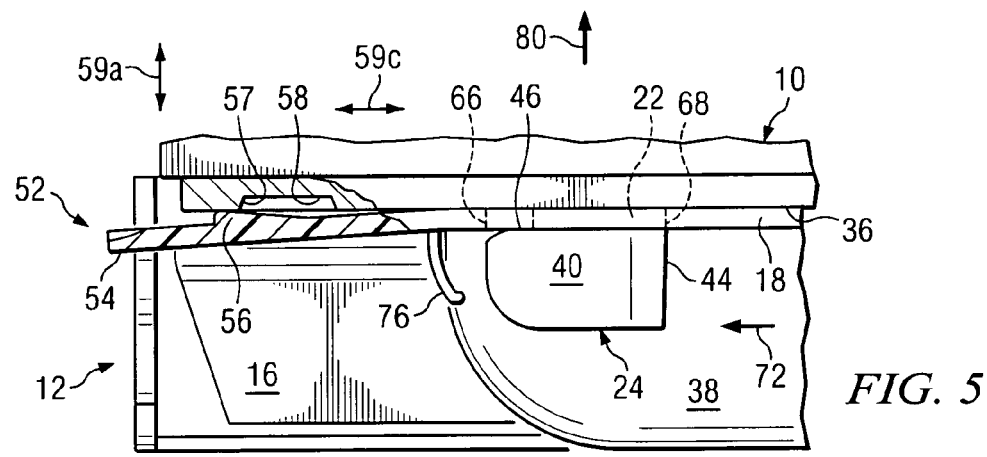
Figure 6:
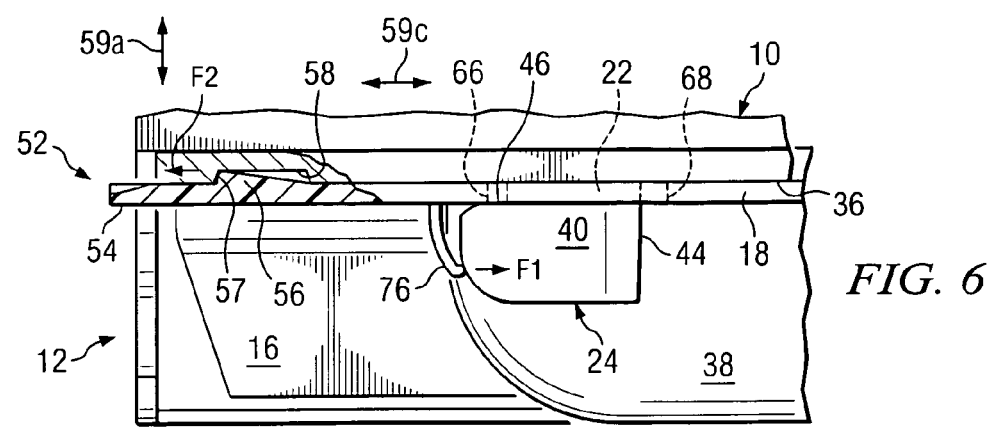

In operation, attachment of pedestal 12 to chassis 10 is performed by aligning feet 24 with openings 22 (FIG. 4). When aligned, feet 24 are inserted inside openings 22 in a first direction, as indicated by arrow 70, until chassis bottom wall 36 is in abutment with transverse support member 18 (FIG. 5). Chassis 10 is then moved relative to pedestal 12 or vice versa in a second direction 59c which is generally perpendicular to first direction 70. This positions a notch 46 of feet 24 adjacent to rear edge 66 of opening 22 and disposes rib 56 inside locking slot 58 (FIG. 6). Accordingly, notch 46 prevents movement in the direction of arrow 59a, edges 62 and 64 of openings 22 restrict lateral movement indicated by arrow 59b (FIG. 3), and both locking member 52 and notch 46 restrict longitudinal movement indicated by arrow 59c so that chassis 10 is securely coupled to pedestal 12 in a locked position. As illustrated in FIGS. 4-6, attachment of pedestal 12 to chassis 10 causes feet 24 to be positioned and/or lifted above a support surface so that base members 14 and 16 support chassis 10 relative to such support surface.

In the embodiment illustrated in FIGS. 4-6, flexible tab 76 is disposed adjacent to one or more rear edges 66 on the underside of transverse support member 18 to engage one or more of the corresponding feet 24. Flexible tabs 76 are formed integral with transverse support member 18. It should be understood, however, that flexible tabs 76 can be a separately attachable to support member 18.

In operation, when system 8 is configured in the locked position, flexible tabs 76 exert a force on feet 24 in the direction of arrow F1, which causes locking slot sidewall 57 to abut rib 56, thereby creating a counter-force F2 resulting from rib 56 exerting a force on sidewall 57. Accordingly, forces F1 and F2 further limit longitudinal movement between chassis 10 and pedestal 12 in the direction of arrow 59c.

To detach chassis 10 from pedestal 12, flexible tab 54 is actuated to retract rib 56 from within locking slot 58. Once removed, chassis 10 is moveable relative to pedestal 12 to remove rear edge 66 from notch 46. When rear edge 66 is completely clear of notch 46, chassis 10 is moved in the direction of arrow 80 to remove feet 24 from corresponding openings 22.

It should be understood that pedestal 12 can be attached to chassis 10 while chassis 10 is disposed on its side to permit convenient access to chassis bottom wall 36, or, in the alternative, pedestal 12 can be attached to chassis 10 without having to access chassis bottom wall 10, that is, without having to turn chassis 10 upside-down or on its side. For example, when chassis 10 lays on its side, chassis bottom wall 36 is positioned adjacent to the edge of a support surface. While in this position, openings 22 on pedestal 12 are aligned with feet 24 so that pedestal 12 can be placed in abutment with chassis bottom wall 36. Pedestal 12 is then moved in the direction opposite of arrow 72 (FIG. 5) until pedestal 12 is in the locked position. Alternatively, when attachment is performed without accessing chassis bottom wall 36, pedestal 12 can be placed on a support surface while chassis 10 is lifted to a position above pedestal 12 to align feet 24 with pedestal openings 22. Once aligned, the user simply lowers computer chassis 10 onto pedestal 12 and moves chassis 10 in the direction of arrow 72 so that the device is positioned in the locked position.

Therefore, in operation, without pedestal 12 attached to chassis 10, feet 24 are used to support a weight of chassis 10 relative to a support surface. Attachment of pedestal 12 to chassis 10 results in a weight of chassis 10 being supported by pedestal 12 relative to a support surface instead of by feet 24 and, in the embodiment illustrated in FIGS. 1-6, feet 24 are used to secure pedestal 12 to chassis 10 and restrict movement of chassis 10 relative to pedestal 12. Further, in the embodiment illustrated in FIGS. 1-6, feet 24 are used to cooperatively engage pedestal 12 to attach pedestal 12 to chassis 10 (e.g., by feet 24 being inserted into and/or otherwise extending through an upwardly facing surface or wall of pedestal 12, such as through openings 22 in support member 18). In the embodiment illustrated in FIGS. 1-6, each of feet 24 are configured to cooperatively engage pedestal 12. However, it should be understood that system 8 may be configured such that a fewer quantity of feet 24 cooperatively engage pedestal 24. In the embodiment illustrated in FIGS. 1-6, pedestal 12 and chassis 10 are configured to align with each other in a generally longitudinal direction relative to each other (e.g., in the direction indication by 59c in FIG. 3). However, it should be understood that pedestal 12 and/or chassis 10 may be otherwise configured to accommodate other attachment directions relative to each other (e.g., pedestal 12 disposed perpendicular to a generally longitudinal direction of chassis 10) by, for example, modifying and/or otherwise coordinatively configuring feet 24 and/or openings 22 to accommodate a different attachment direction.

Thus, embodiments of the present invention provide a computer chassis 10 having a stability system that can be self-aligned and easily attached to computer chassis 10 while the chassis is either disposed vertically or horizontally. Further, chassis 10 can be used and/or shipped with or without pedestal 12 attached to chassis 10. Additionally, embodiments of the present invention enable a user to easily attach pedestal 12 to chassis 10 without further and/or additional attachment parts or tools (e.g., screws, screwdriver, etc.).

What is claimed is:

1. A computer stability system comprising:
   a pedestal adapted to be releasably coupled to a computer chassis, the pedestal adapted to cooperatively engage a plurality of feet extending downwardly from a bottom wall of the computer chassis to releasably couple the pedestal to the computer chassis, the pedestal having a transverse support member with at least one opening to receive the plurality of feet therethrough to seat the transverse support member against the bottom wall of the chassis; and
   a locking member on the pedestal adapted to engage a locking slot on a bottom wall of the computer chassis to restrict movement between the pedestal and the computer chassis.

2. The system of claim 1, wherein the pedestal has at least one opening to cooperatively receive the plurality of feet.

3. The system of claim 1, wherein at least one opening in the pedestal has a shape complementary to the shape of at least one foot.

4. The system of claim 1, wherein the pedestal is configured to cooperatively engage the chassis in a predetermined orientation relative to the chassis.

5. The system of claim 1, wherein the pedestal is adapted to engage at least a portion of at least one foot to secure the chassis to the pedestal.

6. The system of claim 1, wherein the pedestal is adapted to engage a notch of at least one foot on the computer chassis to restrict relative movement between the pedestal and the chassis.

7. The system of claim 1, wherein at least one tab of the pedestal is adapted to engage at least one foot of the chassis to restrict movement between the pedestal and the chassis.

8. A computer stability system comprising:
   a chassis having a plurality of feet disposed on a bottom wall of the chassis, the plurality of feet adapted to support a weight of the chassis relative to a support surface; and
   a pedestal adapted to be releasably coupled to the chassis, wherein the weight of the chassis is transferred by the pedestal to the support surface independently of the plurality of feet when the pedestal is coupled to the chassis.

9. The system of claim 8, wherein the pedestal comprises at least one opening to cooperatively receive the plurality of feet.

10. The system of claim 8, wherein the pedestal comprises at least one opening having a shape complementary to the shape of at least one foot.

11. The system of claim 8, wherein the pedestal is configured to cooperatively engage the chassis in a predetermined orientation relative to the chassis.

12. The system of claim 8, wherein the pedestal is adapted to engage at least a portion of at least one foot to secure the chassis to the pedestal.

13. The system of claim 8, wherein at least one tab of the pedestal is adapted to engage at least one foot to restrict relative movement between the pedestal and chassis.

14. A method of manufacturing a computer stability system comprising:
   providing a computer chassis with a plurality of feet for supporting a weight of the computer chassis relative to a support surface;
   providing a pedestal adapted to engage the computer chassis, the pedestal operable to transfer the weight of the computer chassis to the support surface independently of the plurality of feet when the pedestal is coupled to the computer chassis; and
   providing a locking member on the pedestal adapted to engage the computer chassis to restrict movement between the pedestal and the computer chassis.

15. The method of claim 14, further comprising providing at least one opening in the pedestal with a shape complementary to a shape of at least one foot.

16. The method of claim 14 further comprising providing at least one foot configured to cooperatively engage the chassis in a predetermined orientation relative to the chassis.

17. The method of claim 14, wherein providing the plurality of feet comprises providing at least one foot adapted to be releasably couplable to the pedestal.

18. A computer stability system comprising:
   means for supporting a weight of a computer chassis relative to a support surface; and
   means, releasably couplable to the computer chassis, for transferring the weight of the computer chassis to the support surface independently of the supporting means when the transferring means is coupled to the computer chassis; and
   means for restricting movement of the computer chassis relative to the transferring means when the transferring means is coupled to the computer chassis.

19. A computer stability system comprising:
   a pedestal adapted to be releasably coupled to a computer chassis, the pedestal comprising an opening through which a foot attached to the computer chassis passes to couple the pedestal to the computer chassis, the computer chassis moveable in a first direction to extend the foot through the opening, the computer chassis moveable in a second direction to engage the foot with a transverse support member of the pedestal.

20. The system of claim 19, wherein the opening in the pedestal has a shape complementary to the shape of the foot.

21. The system of claim 20, wherein the foot engages the opening to resist relative movement between the pedestal and computer chassis.

* * * * *

UNITED STATES PATENT AND TRADEMARK OFFICE
CERTIFICATE OF CORRECTION

| | |
|---|---|
| PATENT NO. | : 7,450,371 B1 |
| APPLICATION NO. | : 11/066813 |
| DATED | : November 11, 2008 |
| INVENTOR(S) | : Tom J. Searby |

It is certified that error appears in the above-identified patent and that said Letters Patent is hereby corrected as shown below:

In column 6, line 18, in Claim 18, delete "coupIed" and insert -- coupled --, therefor.

Signed and Sealed this

Fourteenth Day of July, 2009

JOHN DOLL
*Acting Director of the United States Patent and Trademark Office*